United States Patent
McClure et al.

(10) Patent No.: US 7,162,950 B2
(45) Date of Patent: Jan. 16, 2007

(54) TWINE BOX FOR ROUND BALERS

(75) Inventors: John R. McClure, New Holland, PA (US); Fred M. Horchler, Jr., Lancaster, PA (US); Ronald L. McAllister, New Holland, PA (US); James T. Clevenger, Jr., Lancaster, PA (US); John H. Merritt, New Holland, PA (US); Cecil R. Sudbrack, New Holland, PA (US); Joseph N. Smith, Lancaster, PA (US)

(73) Assignee: CNH America LLC, New Holland, PA (US)

( * ) Notice: Subject to any disclaimer, the term of this patent is extended or adjusted under 35 U.S.C. 154(b) by 358 days.

(21) Appl. No.: 10/254,960

(22) Filed: Sep. 25, 2002

(65) Prior Publication Data

US 2004/0177773 A1 Sep. 16, 2004

(51) Int. Cl.
*B65B 13/18* (2006.01)
*B65B 27/00* (2006.01)

(52) U.S. Cl. ............................. 100/8; 100/13; 100/34; 100/88; 53/587; 56/341

(58) Field of Classification Search ............... 100/1, 100/8, 34, 912, 5, 13, 88; 53/118, 390, 587, 53/592, 399, 430, 441; 56/341, 342, 343; 242/141, 146, 170, 598.5
See application file for complete search history.

(56) References Cited

U.S. PATENT DOCUMENTS

| | | | |
|---|---|---|---|
| 4,205,513 A | 6/1980 | Shokoples | 56/341 |
| 4,612,855 A | 9/1986 | Wagstaff et al. | 100/5 |
| 5,230,282 A * | 7/1993 | Barnes | 100/34 |
| 5,349,806 A * | 9/1994 | Swearingen et al. | 56/341 |
| 5,996,307 A | 12/1999 | Niemerg et al. | 53/118 |
| 6,247,291 B1 | 6/2001 | Underhill | 53/118 |

* cited by examiner

*Primary Examiner*—Allen Ostrager
*Assistant Examiner*—Jimmy Nguyen
(74) *Attorney, Agent, or Firm*—Stephen A. Bucchianeri; John William Stader; Michael G. Harms

(57) ABSTRACT

A round baler having storage and dispensing mechanisms for both twine and net/plastic wrapping materials for the bales can be modified to provide a lower cost twine baler. A pivoting dispensing assembly across the front of the baler is replaceable by a similar-sized twine box to convert the baler to an all-twine baler with sufficient twine storage to make the machine efficient in field operations.

4 Claims, 3 Drawing Sheets

TWINE BOX FOR ROUND BALERS

BACKGROUND OF THE INVENTION

In general terms, the instant invention relates to agricultural baling machines for forming generally discrete cylindrical bales of crop material, commonly referred to as round bales, and more particularly to an improved twine box for holding, storing and dispensing twine that is used for wrapping the cylindrical bale to maintain its shape and structural integrity after it is formed in the bale-forming chamber and deposited on the ground.

Round balers have become quite popular throughout the world over the last twenty-five years, to the extent that they have, except for very specific-use situations and operations, all but replaced the previously universally accepted rectangular baler. Farmers have found that the advantages of a larger bale, improved storage and weathering characteristics, and reduced labor costs outweigh the increased equipment costs.

Round balers generally have a bale-forming chamber defined by a pair of opposing side walls associated with an array of side-by-side belts, transverse slats trained on chains, a plurality of transverse rolls or a combination of these various elements. During field operation, windrowed crop material such as hay is picked up from the ground and fed in a continuous stream into a fixed or variable diameter chamber. The hay is rolled into a cylindrical package within the chamber, wrapped with twine, net/plastic wrap and ejected onto the ground for subsequent handling.

U.S. Pat. No. 5,289,672, issued on Mar. 4, 1994, in the name of Kenneth R. Underhill, and U.S. Pat. No. 4,956,968, issued on Sep. 18, 1990, also in the name of Kenneth R. Underhill, disclose one type of prior art round baler of the general nature described above. In this particular type of baler, a pair of fixed sidewalls defines an expandable chamber, and a plurality of side-by-side belts cooperating with a series of transverse rolls mounted between a pair of pivotally mounted arms. This arrangement of rolls and arms is commonly referred to as a sledge assembly. The chamber includes an inlet opening in the front through which crop material is fed. Also included is a pair of take-up arms pivotally mounted on the main frame, between which arms a pair of guide rolls is journaled. A biasing force on the take-up arms urges the outer surfaces of the guide rolls against the belts to maintain tension and thereby prevent slack from occurring in the belts during expansion and contraction of the chamber. Varying the force on the take-up arms regulates the density of the bale.

Another type of prior art round baler of the same general nature as that described immediately above employs a plurality of transverse rolls to define a cylindrical bale-forming chamber having a fixed diameter. Examples of this type baler are shown in U.S. Pat. No. 4,612,855, issued on Sep. 23, 1986, in the name of Robert A. Wagstaff et al., U.S. Pat. No. 4,604,848, issued Aug. 12, 1986, in the name of Gerhard Clostermeyer, and U.S. Pat. No. 4,841,851, issued on Jun. 2, 1989, in the name of Pierre Quataert. It should be noted that the '851 patent shows additional embodiments wherein a fixed diameter chamber is defined by means other than rolls. U.S. Pat. No. 5,349,806, issued on Sep. 27, 1994, in the name of John R. Swearingen et al. and U.S. Pat. No. 4,610,123, issued Sep. 9, 1986, in the name of Bernard Krone et al. are additional examples of prior art round balers having fixed diameter chambers defined by transverse slats.

The instant invention relates to apparatus for storing twine used in a wrapping system for a round baler. The type of round baler to which the instant invention is adaptable is basically unlimited, because, as will be discussed further below, the twine box of the instant invention can prove advantageous in several ways over similar devices heretofore known and used in substantially all types of round balers.

As stated above, it is not uncommon in prior art round balers to dispense the twine from a storage container carried on the baler main frame, as shown, for example, in the '968 patent referred to above. The novel and unique characteristics of the instant invention, described in detail below, contribute to a wrapping system for round balers that conveniently stores twine in a location consistent with the appropriate introduction of twine to the periphery of the cylindrical package of crop material formed in the bale-forming chamber, regardless of whether the diameter of the chamber is fixed or variable, and regardless of the nature of the transverse wall, i.e., whether belts, rolls, slats, or a combination thereof.

U.S. Pat. No. 6,247,291, issued on Jun. 19, 2001, in the name of Kenneth R. Underhill, discloses a storage apparatus for round balers wrapping material. The term "wrapping material" encompasses not only twine, but also, rolls of wrapping material, such as net/plastic wrap. In order to be able to alternatively dispense these two types of wrapping material, the storage means, or container of the '291 patent, is pivotably mounted to the main frame, across the front of the bale-forming chamber. The chamber shown in the patent holds one operable elongate roll of net/plastic wrap plus an extra. This patent (U.S. Pat. No. 6,247,291) is hereby incorporated herein in its entirety by reference, as well as any documents incorporated therein by reference.

A family of presently commercially available machines, exemplified by the New Holland Model 688 Round Baler, employs a storage apparatus similar in some respects to that shown in the '291 patent; however, the storage compartment includes space only for net/plastic wrap and two balls of twine, one at each end of the net/plastic wrap roll. In order to employ more than two bales of twine, an important efficiency characteristic, the operator must remove much of the net/plastic wrap mechanism to make room for additional twine bales.

Some difficulties and shortcomings have been identified in the structure of the '291 storage means, including the inconvenience of having too little storage space, under practical conditions, for twine to maximize efficiency of the baler in field operation. Also, the process has been found to be inconvenient and excessively time consuming to switch between twine and net/plastic wrap operations. Further, the commercially available machines, such as that mentioned above, are also somewhat difficult and time consuming to change over for efficient operation. The unique features proffered by the structure of the instant invention overcome the shortcomings identified and contribute to improved performance and operability of round balers. Additionally, these features are consistent with simplification and enhancement of routine serviceability as well as field maintenance, all of which lead to a baler that is significantly more operator friendly than prior art balers.

SUMMARY OF THE INVENTION

Accordingly, it is an object of the instant invention to provide a round baler with a pivotable twine box and dispensing of net/plastic wrap, and side compartments that store an efficient number of twine rolls so that alternative wrapping materials may be selected by the operator without the need for time consuming changeover.

It is another object of the instant invention to provide a fixed twine roll chambers at the front and sides of a round baler.

It is a further object of the instant invention to provide a round baler having convenient storage and dispensing chambers for both twine and sheet-like wrapping materials.

These and other objects are obtained by providing a round baler having storage and dispensing mechanisms for both twine and net/plastic wrapping materials for the bales can be modified to provide a lower cost twine baler. A pivoting dispensing assembly across the front of the baler is replaceable by a similar-sized twine box to convert the baler to an all-twine baler with sufficient twine storage to make the machine efficient in field operations.

DETAILED DESCRIPTION OF THE PREFERRED EMBODIMENT

The terms "left" and "right", "up" or "upwardly" and "down" or "downwardly" are used herein for clarity and ease of description only. They refer to directions as relate to the machine, setting on the ground, facing in the normal direction of travel while in operation.

Before beginning the detailed description, it should first be clearly understood that the type of balers, and its particular mode of operation is generally irrelevant to the application of the instant invention. The specific embodiment shown is a belt baler with a variable bale-forming chamber. The particulars of how this baler operates will not be discussed in detail, as in a general sense they are well known in the art.

Figure 1:
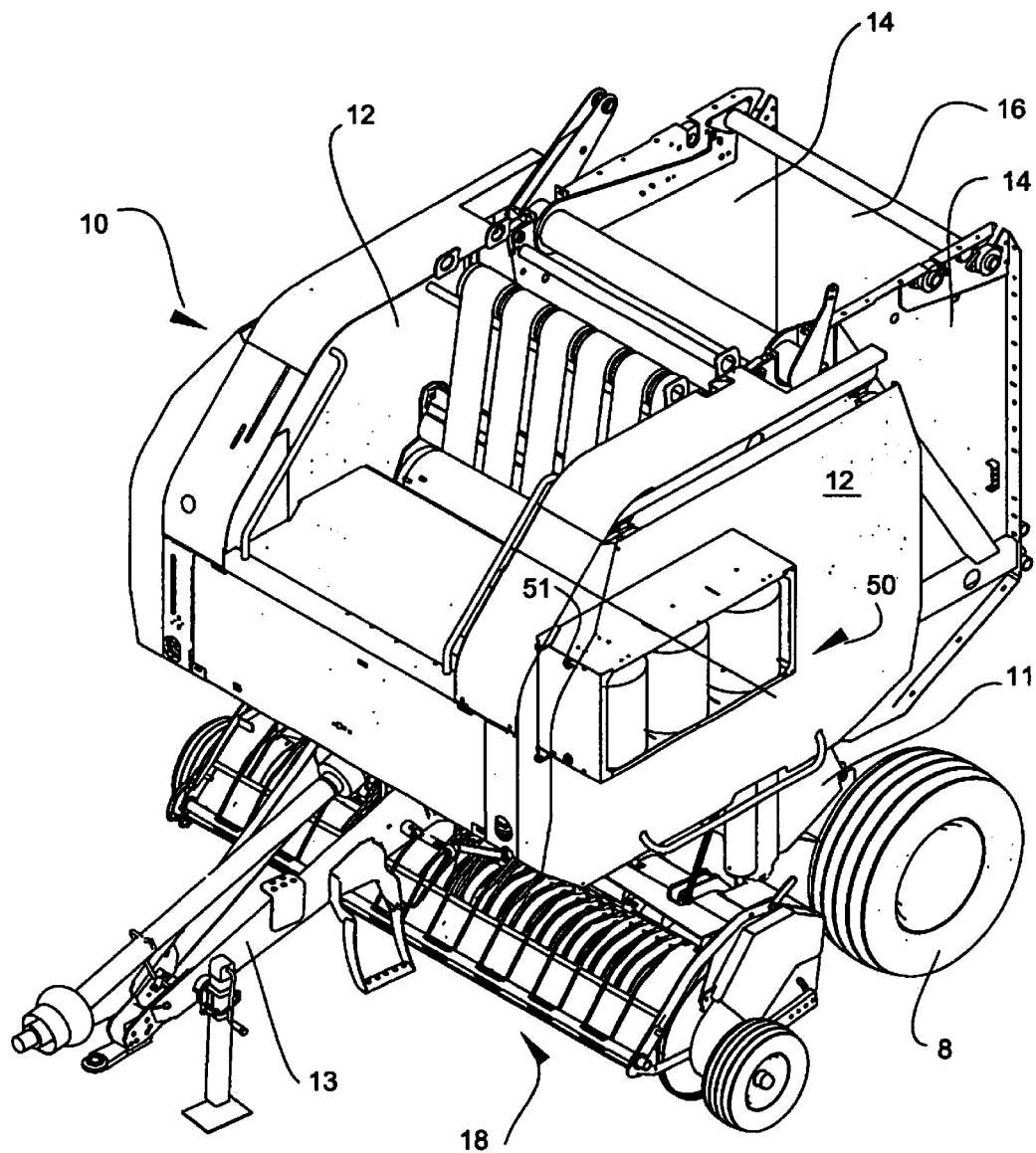
FIG. 1 is a left frontal elevated perspective view of a round baler showing a twine box of the instant invention on the side of the baler, the box shown through a side panel.

Referring now to FIG. 1 for a more detailed description of the preferred embodiment, a left frontal elevated perspective view of round baler 10 of the type in which the instant invention is readily embodied is shown. Baler 10 has an expandable bale-forming chamber defined in part by belts and rolls. This type of expandable chamber is disclosed in various prior art patents, e.g., U.S. Pat. No. 4,956,968, mentioned above, which is hereby incorporated in its entirety by reference. Since the instant invention is an improvement over the storage means shown in the '291 patent mentioned above, only the significant and necessary structure relating to the baler will be discussed in detail. Attention is directed to the '291 patent for more specific particulars relating to the baler itself.

Baler 10 has a main frame 11, comprising a plurality of rigid structural elements including a pair of sidewalls 12). Main frame 11 is supported by a pair of wheels 8 (also only one shown). A forwardly mounted tongue 13, integral with main frame 11, provides for connection to a tractor or other prime mover. Pivotally connected to sidewalls 12 by a pair of stub shafts is a tailgate 16 that is closed during bale formation. Tailgate 16 includes sidewalls coplanar with sidewalls 14. A pickup 18, mounted on main frame 11, has a plurality of tines, the tips of which are movable along a predetermined path to lift crop material from the ground and deliver it rearwardly along a generally horizontal path toward a floor roll, rotatably mounted on main frame 11.

As best seen in FIG. 1, twine box 50 is positioned on the side of the bale-forming chamber and attached to sidewall 12. Sidewall 12 is, in turn, attached to main frame 11 and other structural members as appropriate. Behind sidewall 12 are many of the operational components (not shown) of the baler 10, such as, for example, journals and bearings, cables, etc. The twine feeds out of twine box 50 through the forward inside end thereof, or through an opening 51 adjacent the forward inside end thereof, and is fed to the twine dispensing mechanism. Twine box 60 could be advantageously made in accordance with the twine box shown in co-pending U.S. patent application Ser. No. 10/165,586 filed on Jun. 8, 2002, and entitled "Pivoting Twine Box".

A pivotable side panel 60 can cover the twine box 50 and hold the twine in position. The twine balls could also be held in position with any other type of reasonable mechanism, such as, for example, a strap across the open portion thereof. Though panel 60 could be merely removable, it is shown as being pivoted vertically. Panel 60 could also pivot forwardly, rearwardly, or could include an additional smaller door to provide access to the twine box 50. Panel 60 would, of course, include some type of latching mechanism (not shown) to hold it in the open position and to lock it in the closed position.

Twine box 50 comprises a rectangular open-sided box made up of sheet metal components. In this particular embodiment, there is room inside twine box 50 for three balls of twine; however, the maximum number of balls is limited practically only by the size of the baler itself. Separator plates, or dividers (not shown) either fixed or removable, may be included in the twine box to separate the balls of twine.

While only one twine box is shown in the drawings, it is anticipated that for convenience sake, a similar twine box may be installed on the opposing side to operate in a similar manner, doubling the amount of twine available during field operation.

Figure 2:
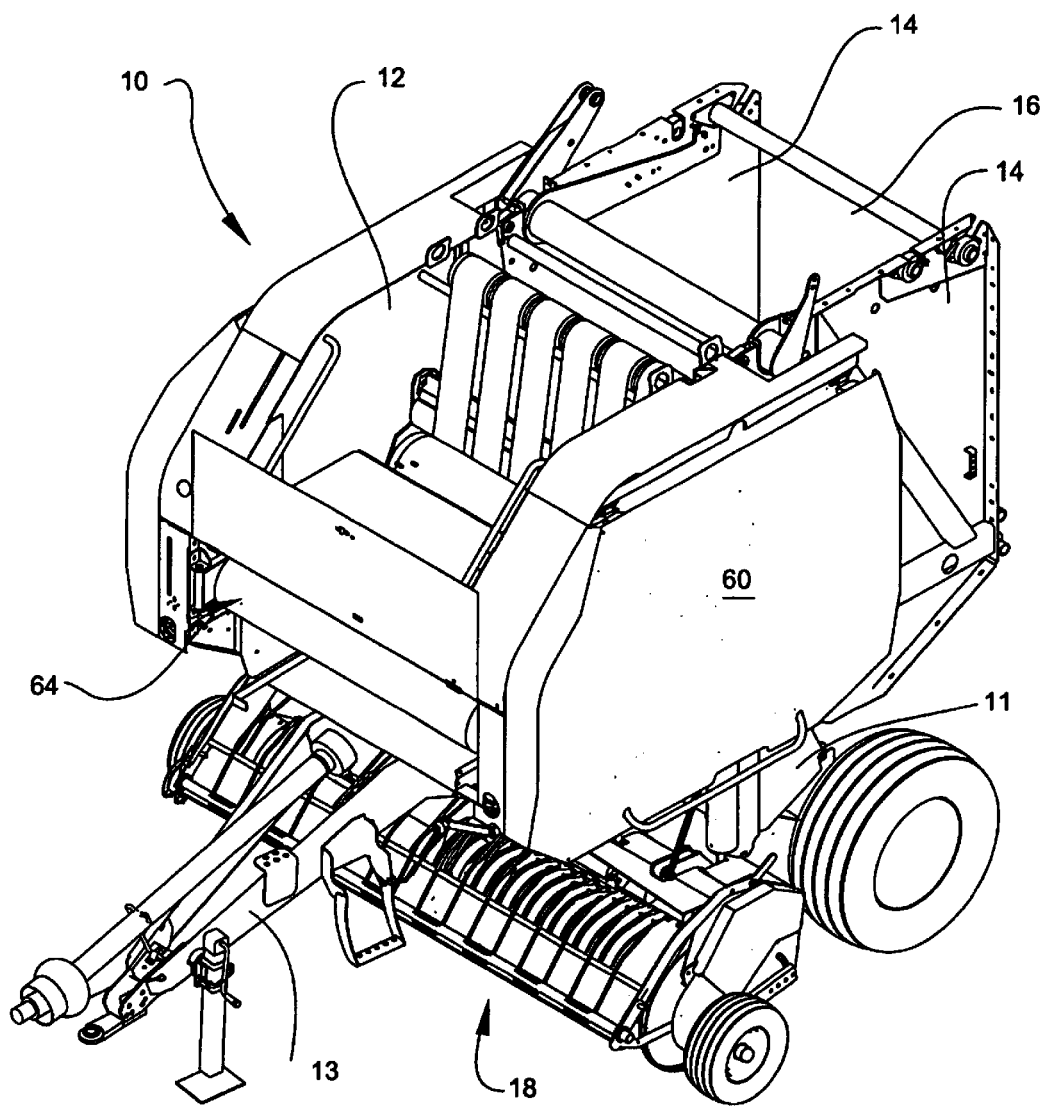
FIG. 2 is a left frontal elevated perspective view of the round baler of FIG. 1, showing the door, or panel covering the pivoting chamber open.
Figure 3:
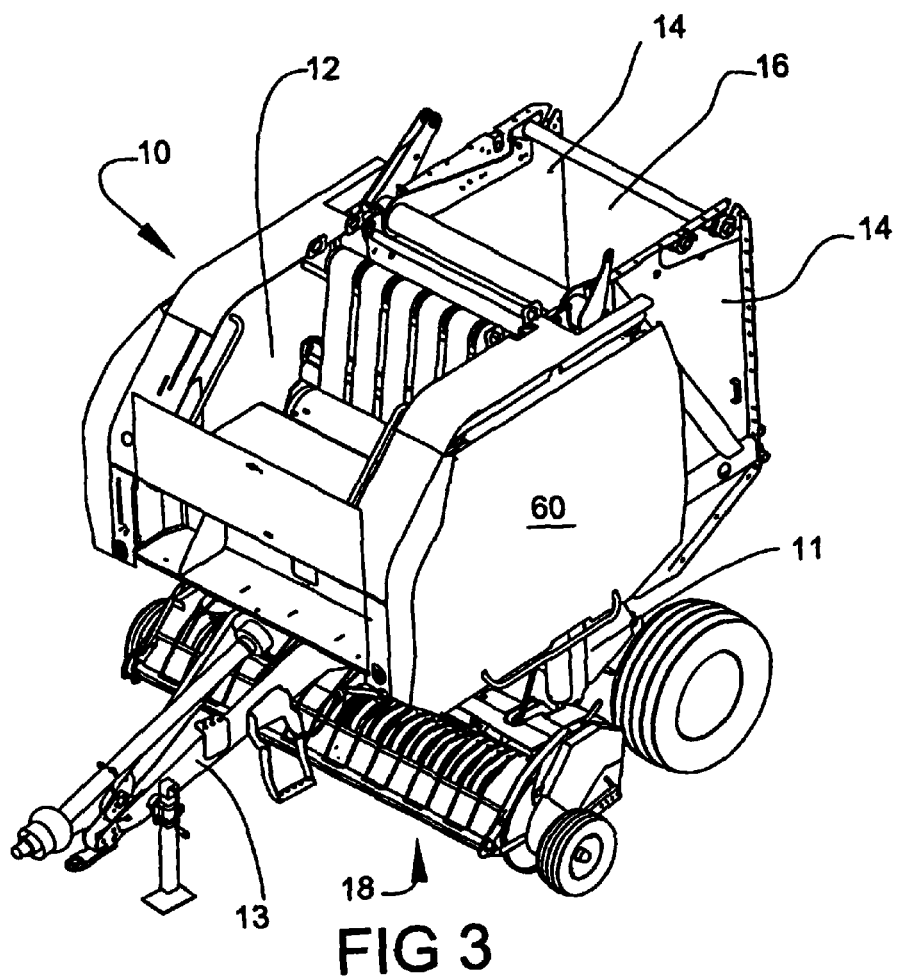
FIG. 3 is a left frontal elevated perspective view of a round baler, similar to FIG. 2, showing the alternative fixed twine box in place of the pivoting chamber.

Across the front of the baler, and not shown in detail, is a roll-feeding mechanism 64 (see FIG. 2). This roll-feeding mechanism is of known structure, such as that generally shown in the '291 patent. The mechanism may hold multiple rolls of roll material, such as net/plastic wrapping material, and may pivot at one end to improve access to the working elements behind the chamber.

Figure 4:
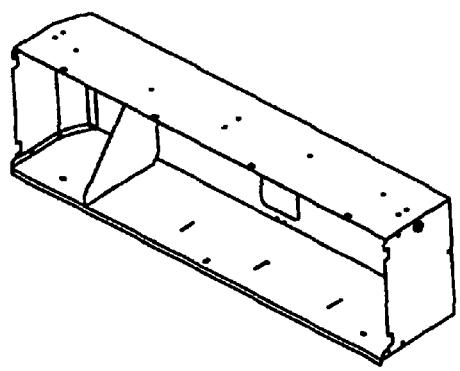
FIG. 4 is a left frontal elevated perspective view of the fixed twine box of FIG. 3.

An alternative, very cost effective twine baler can be arranged by removing the pivoting roll-feeding mechanism and substituting a fixed twine box, such as shown in FIG. 4. Such an arrangement would not be as flexible as the primary unit, but would be a lower in cost where that is a major factor.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions. Accordingly, the following claims are intended to protect the invention broadly as well as in the specific form shown.

Having thus described the invention, what is claimed is:

1. In a round baler for forming crop material into cylindrical bales, said baler including:

a wheel-supported main frame including opposing longitudinal sidewalls;

a bale-forming chamber having a generally cylindrical shape with a transverse inlet and a crop-engaging mechanism disposed between said sidewalls;

a crop feeding mechanism for feeding crop material into said chamber through said inlet whereupon said crop material is engaged by said crop-engaging mechanism under conditions where said crop engaging mechanism is moving along a portion of said periphery to engage said crop material and form it into a compacted cylindrical package as crop material accumulates in said chamber, said crop engaging mechanism including functional components affixed to and accessible through said sidewalls;

a supply of wrapping material;

a dispensing assembly including a mechanism for dispensing wrapping material from said supply of wrapping material into said chamber for wrapping the outer surface of said cylindrical package of crop material to form a round bale of crop material;

a storage box for storing said supply of wrapping material;

said storage box mounted on said main frame across said bale-forming chamber and pivotable from an operative position adjacent said dispensing assembly to an inoperative position away from said dispensing assembly for providing access to said storage box and said dispensing assembly, the improvement comprising:

an elongate front twine box for holding multiple balls of twine and adapted to direct twine therein to said dispensing assembly; and wherein said storage box is readily removable and replaceable by said front twine box which is of such size and dimensions to be fixed in place in the area previously occupied by said storage box.

2. The round baler of claim 1, further including:

a side twine box affixed to the exterior of each of said sidewalls, said side twine boxes each of sufficient size to hold multiple bales of twine and adapted to successively direct the twine in the multiple bales to said dispensing assembly.

3. A round baler for forming crop material into cylindrical bales, said baler comprising:

a wheel-supported main frame including opposing longitudinal sidewalls;

a bale-forming chamber having a generally cylindrical shape with a transverse inlet and a crop-engaging mechanism disposed between said sidewalls;

a crop feeding mechanism for feeding crop material into said chamber through said inlet whereupon said crop material is engaged by said crop-engaging mechanism under conditions where said crop engaging mechanism is moving along a portion of said periphery to engage said crop material and form it into a compacted cylindrical package as crop material accumulates in said chamber, said crop engaging mechanism including functional components affixed to and accessible through said sidewalls;

a supply of wrapping material;

a dispensing assembly including a mechanism for dispensing wrapping material from said supply of wrapping material into said chamber for wrapping the outer surface of said cylindrical package of crop material to form a round bale of crop material;

a storage box for storing said supply of wrapping material;

said storage box mounted on said main frame across said bale-forming chamber and pivotable from an operative position adjacent said dispensing assembly to an inoperative position away from said dispensing assembly for providing access to said storage box and said dispensing assembly, said storage box being readily removable;

an elongate front twine box for holding multiple balls of twine and adapted to direct twine therein to said dispensing assembly; and wherein said storage box replaceable by said front twine box which is of such size and dimensions to be fixed in place in the area previously occupied by said storage box.

4. The round baler of claim 3, further including:

a side twine box affixed to the exterior of each of said sidewalls, said side twine boxes each of sufficient size to hold multiple bales of twine and adapted to successively direct the twine in the multiple bales to said dispensing assembly.

* * * * *